United States Patent [19]

Ogawa et al.

[11] Patent Number: 5,608,707
[45] Date of Patent: Mar. 4, 1997

[54] RECORDING SYSTEM FOR SIGNALONG DISC PLAYER

[75] Inventors: Masaya Ogawa; Toshiji Daito; Shinichi Takata, all of Saitama-ken, Japan

[73] Assignee: Pioneer Electronic Corporation, Tokyo, Japan

[21] Appl. No.: 594,510

[22] Filed: Jan. 31, 1996

Related U.S. Application Data

[63] Continuation of Ser. No. 132,353, Oct. 6, 1993, abandoned.

[30] Foreign Application Priority Data

Oct. 14, 1992 [JP] Japan .................................. 4-275852

[51] Int. Cl.⁶ .................................................. G11B 7/00
[52] U.S. Cl. .............................................. 369/84; 369/34
[58] Field of Search ................................ 369/47, 49, 84, 369/48, 33, 4, 34, 32; 360/18, 19.1; 84/625, 641, 631, 609, 645

[56] References Cited

U.S. PATENT DOCUMENTS

| | | | |
|---|---|---|---|
| 1,772,990 | 8/1930 | Feher | 369/33 |
| 2,557,031 | 6/1951 | Isbenjian | 369/4 |
| 3,444,334 | 5/1969 | Clark | 369/33 |
| 5,025,431 | 6/1991 | Naito | 369/34 |
| 5,033,036 | 7/1991 | Ohmori et al. | 369/4 |
| 5,107,474 | 4/1992 | Ishibashi | 369/36 |
| 5,131,311 | 7/1992 | Murakami et al. | 84/609 |
| 5,194,682 | 3/1993 | Okamura et al. | 369/48 |
| 5,218,580 | 6/1993 | Okamura et al. | 369/4 |
| 5,245,600 | 9/1993 | Yamauchi et al. | 369/49 |
| 5,250,747 | 10/1993 | Tsumura | 84/645 |
| 5,294,746 | 3/1994 | Tsumura et al. | 84/631 |
| 5,296,126 | 3/1994 | Okano et al. | 369/47 |

FOREIGN PATENT DOCUMENTS 3-296193  12/1991  Japan .

*Primary Examiner*—Nabil Hindi
*Attorney, Agent, or Firm*—Nikaido, Marmelstein, Murray & Oram LLP

[57] ABSTRACT

A storing portion is provided for storing a plurality of recordable discs, and a recording device is for recording an accompaniment reproduced by a singalong disc player and a vocal part sang at the accompaniment. A loading device is provided for carrying a disc between the storing portion, and the recording device. An ejecting mechanism is provided for ejecting a recorded disc.

3 Claims, 3 Drawing Sheets

RECORDING SYSTEM FOR SIGNALONG DISC PLAYER

This application is a continuation of application Ser. No. 08/132,353, filed Oct. 6, 1993, now abandoned.

BACKGROUND OF THE INVENTION

The present invention relates to a recording system adapted to be operated together with a singalong disc player for playing a disc on which instrumental accompaniments of songs are recorded.

There has been a demand to record one's voice as he sings at the accompaniment reproduced by the singalong disc player. In a conventional recording system, the vocal and instrumental signals are mixed and recorded on a magnetic tape loaded on a cassette tape recorder. The recording system is manually operated to start the recording at a timing each time a song is sung. However, the manual operation is troublesome, and often ends in failure.

SUMMARY OF THE INVENTION

An object of the present invention is to provide a recording system which is operatively connected with a singalong disc player so as to automatically record audio data produced by the disc player.

According to the present invention there is provided a recording system for a singalong disc player comprising disc outlet means, a storing portion for storing a plurality of recordable discs, a recording device for recording information on the recordable disc, loading means for carrying the disc between the storing portion, the recording device and the disc outlet means, input means for applying an audio signal including an accompaniment reproduced by the singalong disc player and a vocal part sang at the accompaniment to the recording device, discharging means for discharging a recorded disc to the disc outlet means, and control means for controlling the recording system so as to be operated in accordance with signals fed from the singalong disc player. A charge receiving means may be provided for operating the recording system in accordance with a received charge.

Other objects and features of this invention will become understood from the following description with reference to the accompanying drawings.

DETAILED DESCRIPTION OF THE PREFERRED EMBODIMENT

Figure 1:
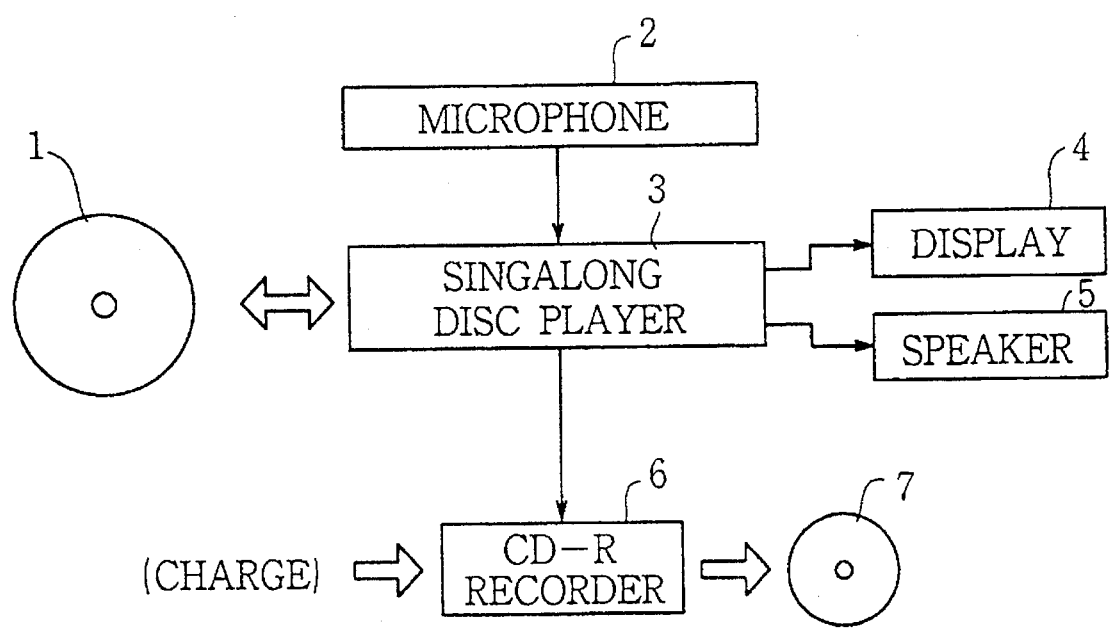
FIG. 1 is a schematic block diagram of a singalong disc player system provided with a CD-R recorder according to the present invention.

Referring to FIG. 1, a singalong disc player 3 to which the present invention is applied reads recorded data on a singalong disc 1 and reproduces audio signals representing instrumental accompaniments of songs and a video signal representing pictorial images appropriate for each song.

A vocal signal picked up by a microphone 2 is fed to the disc player 3 and mixed with the reproduced audio signal. The mixed audio signal is amplified and fed to a speaker 5. The video signal, after an appropriate signal processing, is applied to a CRT display 4.

The mixed audio signal is further fed to a compact disc-recordable (CD-R) recorder 6 wherein the mixed signal, that is the vocal part and the accompaniment part of a song, is recorded on a CD-R 7. The CD-R recorder 6 may be provided with a charge receiving device so that the CD-R recorder is operated to record a CD-R when a predetermined charge is paid.

Figure 2:
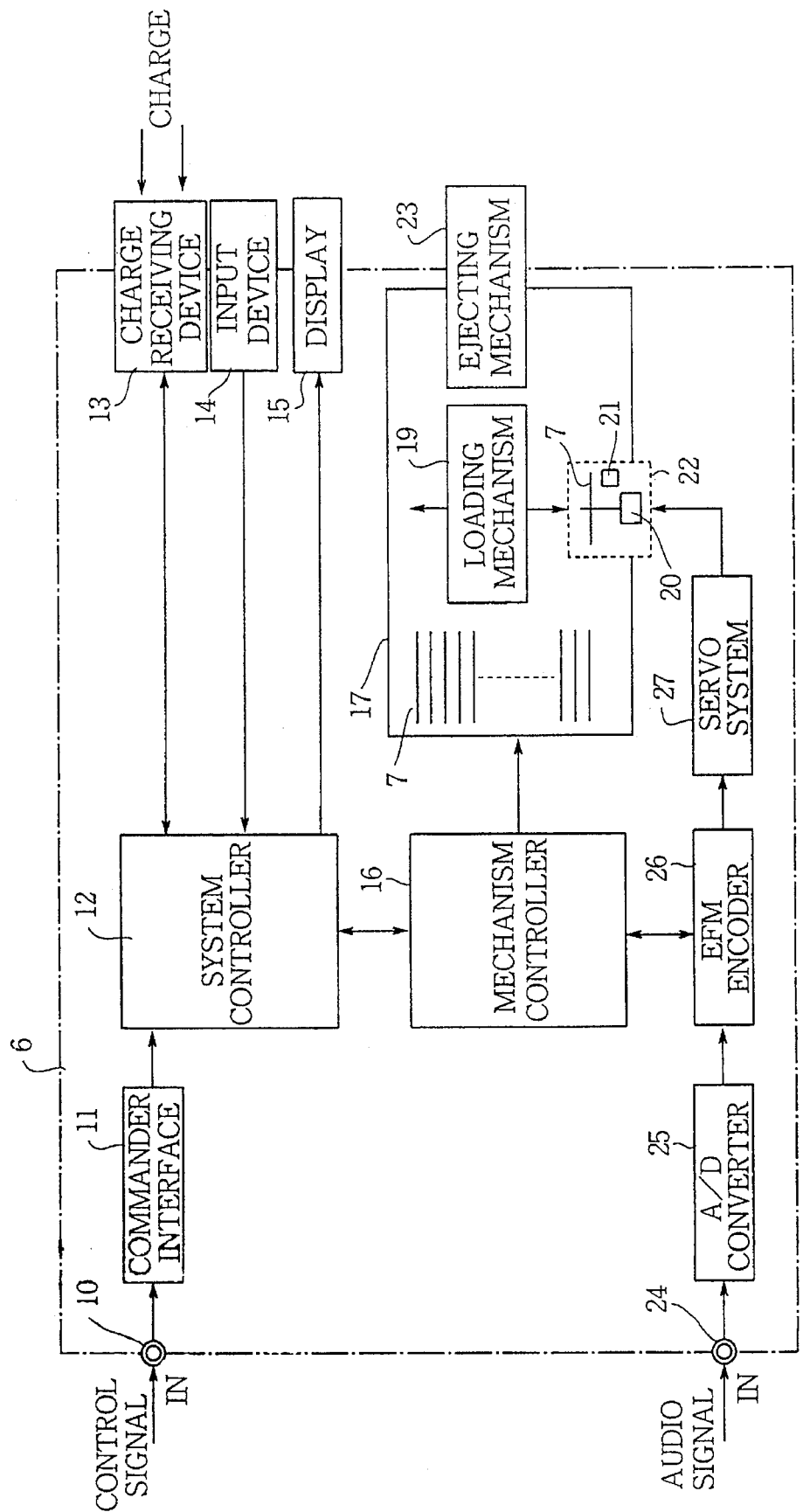
FIG. 2 is a block diagram showing the CD-R recorder of FIG. 1.

Referring to FIG. 2, the CD-R recorder 6 is applied with a control signal from the singalong disc player 3 through an input terminal 10. The input terminal 10 is, for example a DIN8P terminal, connected to the singalong disc player 3. The control signal represents information necessary to operate the recorder 6 in accordance with the operation of the disc player 3. Namely, the control signals are, for example, a PLAY signal indicating that a disc is currently played on the disc player 3, REM signal for remote controlling the recorder 6, C-DOWN signal indicating that the player 3 has been stopped playing, ACK signal indicating that data are fed to the disc player 3 through operational keys.

The control signals are fed to a system controller 12 through a commander interface 11. The system controller 12 is further applied with output signals of a charge receiving device 13 and an input device 14. When the input device 14 is operated to record the audio signal on a CD-R 7, the system controller 12 applies a signal to a display 15 to indicate necessary information for recording in accordance with the output signals of the charge receiving device 13. The controller 12 further applies a signal to a mechanism controller 16 to control the recording operation.

The CD-R recorder 6 further has an input terminal 24 to which the mixed audio signal of the vocal and instrumental parts of a song is fed from the disc player 3. The audio signal is fed to an eight to fourteen modulation (EFM) encoder 26 through an A/D converter 25. The EFM endcoder 26 converts the digital audio signal into digital modulation codes enabling the audio signal to be recorded on the CD-R.

The output signal of the EFM encoder 26 is fed to a recording section 22 in a recording device 17 through a servo system 27. The recording section 22 comprises a recording head 21 and a spindle motor 20 for rotating a CD-R 7. The servo system comprises a spindle servo system for controlling the spindle motor 20, focusing servo system, slider servo system, and track-following servo system, each of which is for controlling the recording head 21. The output signal is fed to the mechanism controller 16.

The recording device 17 stores a plurality of unrecorded CD-Rs 7. A loading mechanism 19 controlled in accordance with a signal from the mechanism controller 16 transfers one of the CD-Rs to a turntable (not shown) provided in the recording section 22. The coded audio data from the EFM encoder 26 is written on the CD-R 7 by the recording head 21. Thereafter, the loading mechanism 19 transfers the recorded CD-R 7 toward an ejecting mechanism 23 which ejects the disc out of the recording device 17 in accordance with a signal from the mechanism controller 16.

Figure 3:
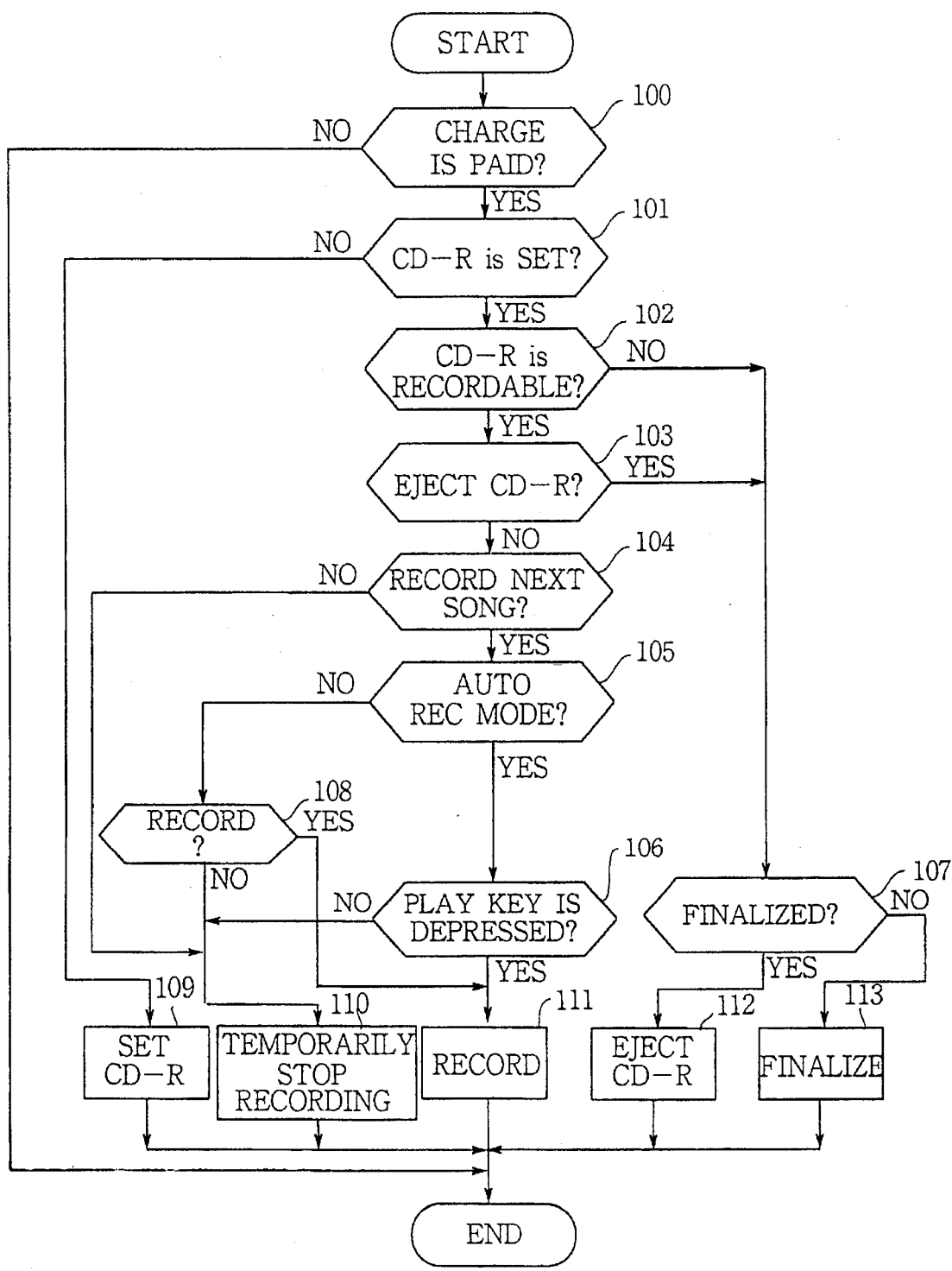
FIG. 3 is a flowchart describing the operation of the CD-R recorder.

The operation of the present invention is described hereinafter with reference to the flowchart of FIG. 3. The routine is repeated at a predetermined interval.

A user of the singalong disc player 3 selects a plurality of songs which he desires to sing. In order to record the singer's voice on the CD-R 7, the user inserts coins, token money or bills in the charge receiving device 13 of the CD-R recorder 6. If the recorder 6 is in an automatic recording mode, where the selected songs are automatically recorded when sung, a PLAY key provided in the input device 14 is depressed. The CD-R recorder 6 may be adapted to distribute recorded CD-Rs free of charge.

At a step 100, it is determined that the charge is paid. When a CD-R 7 is not yet set at a recording position of the recording section 22 in the recording device 17, the program goes from a step 101 to a step 109 where the loading mechanism 19 of the recording device 6 is operated. After the disc 7 is set at the recording position, it is determined whether the set CD-R 7 is recordable at a step 102, that is, whether the CD-R has an empty space where data can be written, or the space is full so that the data cannot be recorded any more.

If the CD-R is still recordable, the program goes to a step 103 where it is determined whether the user has instructed to stop the recording and eject the CD-R out of the recorder 6 as described hereinafter. When continuing the recording, the program proceeds to a step 104 where it is determined that the next song selected at the singalong disc player 3 is to be recorded. If the song is to be recorded, in the automatic recording mode, the program goes from a step 105 to a step 106 where it is confirmed that the PLAY key is depressed.

In a manual recording mode, the program proceeds to a step 108 from the step 105. The user operates the input device 14 before recording each song. The recording is temporarily stopped (step 110) if the input device 14 is not operated to record a desired song at the step 108.

Thereafter, the program goes from the step 106 or the step 108 to a step 111 where the audio signal fed from the singalong disc player 3 through the input terminal 24 is recorded on the CD-R 7.

The operation is repeated until all of the selected songs are recorded. If the user does not desire to record the next song, the program goes from the step 104 to the step 110, thereby temporarily stopping the recording.

In order to end the recording, the input device 14 is operated to compulsorily eject the recorded CD-R 7. Hence the program goes from the step 103 to a step 107 where it is determined whether the system is finalized, that is a process for completing the recording has been executed. If not, the system is finalized at a step 113, and thereafter, the loading mechanism 19 carries the CD-R to the ejecting mechanism 23, thereby ejecting the CD-R out of the CD-R recorder 6 at a step 112.

If the CD-R set at the recording portion is full and can no longer store data, the program goes from the step 102 to step 107.

In the recording system of the present invention, an accompaniment reproduced by the disc player and a vocal part sung to the accompaniment are automatically recorded on a recordable disc. The disc is automatically loaded and ejected out in accordance with the operation of the disc player so that songs are recorded without fail.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A recording system for a singalong optical disc player, comprising:

disc outlet means;

a storing means for storing a plurality of recordable optical discs;

selecting means for selecting a plurality of songs from the stored optical disc:

loading means for carrying the optical disc between the storing means, the recording device, and the disc outlet means;

input means for applying an audio signal including an accompaniment reproduced by the singalong optical disc player and a vocal part sang at the accompaniment to the recording device;

discharging means for discharging a recorded disc to the disc outlet means; and control means for controlling the recording system so as to be operated in accordance with signals fed from the singalong optical disc player, said control means including determining means for determining that the singalong optical disc player is in a disc playing state, said control means also for producing a recording signal, said recording device being responsive to said recording signal, to thereby record information, said control means including finalizing means responsive to an electrical ejection instruction to eject for performing an electrical finalization for completing the recording before ejecting the recorded optical disc.

2. The system according to claim 1 the control means including determining means for determining that an optical disc set in the disc player has no empty space, and for producing the electrical ejection instruction.

3. The system according to claim 1 the control means including determining means for determining that selected songs selected by the selecting means have yet to be recorded, and for continuing to produce the recording signal until the selected songs are completely recorded.

\* \* \* \* \*

UNITED STATES PATENT AND TRADEMARK OFFICE
CERTIFICATE OF CORRECTION

PATENT NO. : 5,608,707

DATED : March 4, 1997

INVENTOR(S) : Ogawa et al.

It is certified that error appears in the above-indentified patent and that said Letters Patent is hereby corrected as shown below:

On title page, item [54] and col. 1, line 1,
delete "SIGNALONG" insert therefor -- A SINGALONG --

Signed and Sealed this

Twentieth Day of May, 1997

*Attest:*

BRUCE LEHMAN

*Attesting Officer*     *Commissioner of Patents and Trademarks*